(12) United States Patent
Ogiso et al.

(10) Patent No.: US 6,898,946 B2
(45) Date of Patent: May 31, 2005

(54) VEHICLE AIR-CONDITIONING SYSTEM

(75) Inventors: Akio Ogiso, Okazaki (JP); Satohisa Yoshida, Anjo (JP); Makoto Umebayashi, Chiryu (JP)

(73) Assignee: DENSO Corporation, Kariya (JP)

( * ) Notice: Subject to any disclaimer, the term of this patent is extended or adjusted under 35 U.S.C. 154(b) by 48 days.

(21) Appl. No.: 10/702,399

(22) Filed: Nov. 5, 2003

(65) Prior Publication Data

US 2004/0089004 A1 May 13, 2004

(30) Foreign Application Priority Data

Nov. 8, 2002 (JP) ........................................ 2002-325453

(51) Int. Cl.$^7$ ................................................. B60H 1/32
(52) U.S. Cl. ............................. 62/200; 62/206; 62/244
(58) Field of Search .................... 62/199–200, 203–206, 62/244

(56) References Cited

U.S. PATENT DOCUMENTS

| | | | | |
|---|---|---|---|---|
| 4,389,855 A | * | 6/1983 | Ueda et al. | 62/200 |
| 4,483,151 A | * | 11/1984 | Fujioka et al. | 62/157 |
| 4,637,220 A | * | 1/1987 | Sakano | 62/200 |
| 4,873,837 A | * | 10/1989 | Murray | 62/199 |
| 4,959,974 A | * | 10/1990 | Kusakabe | 62/228.5 |
| 5,385,035 A | * | 1/1995 | Nishida et al. | 62/525 |
| 6,038,874 A | * | 3/2000 | van der Walt et al. | 62/198 |
| 6,092,379 A | * | 7/2000 | Nishida et al. | 62/200 |
| 6,415,619 B1 | * | 7/2002 | Bash et al. | 62/228.4 |
| 2003/0051494 A1 | | 3/2003 | Ohya | |

FOREIGN PATENT DOCUMENTS

| | | |
|---|---|---|
| JP | 6-255354 | 9/1994 |
| JP | 10-119560 | 5/1998 |

* cited by examiner

*Primary Examiner*—William E. Tapolcai
(74) *Attorney, Agent, or Firm*—Harness, Dickey & Pierce, PLC (57) ABSTRACT

A vehicle air-conditioning system of a dual air conditioner type includes a front seat air-conditioning unit for air-conditioning a front seat side and a rear seat air-conditioning unit for air-conditioning a rear seat side. The system includes parallel connected evaporators for the front seat air-conditioning unit and the rear seat air-conditioning unit. At a low flow rate of refrigerant, the system prevents a significant increase in the temperature of air blown into the rear seat area relative to the temperature in the front seat area. The system employs a variable capacity compressor that enables its discharge capacity to be controlled by an external control signal, allowing the discharge capacity of the compressor to be controlled in accordance with the higher evaporator temperature of the temperatures at the front seat evaporator and the rear seat evaporator and a target evaporator temperature.

17 Claims, 6 Drawing Sheets

VEHICLE AIR-CONDITIONING SYSTEM

CROSS REFERENCE TO RELATED APPLICATIONS

This application is based upon, claims the benefit of priority of, and incorporates by reference the contents of, Japanese Patent Application No. 2002-325453 filed on Nov. 8, 2002.

FIELD OF THE INVENTION

The present invention relates generally to a vehicle air-conditioning system and, more particularly, to operational control of the vehicle air-conditioning system.

BACKGROUND OF THE INVENTION

A conventional vehicle air-conditioning system includes a variable capacity compressor to control the temperature at the evaporator. This system is operative to calculate the deviation of an actual evaporator blowing temperature Te sensed by a temperature sensor from a target evaporator temperature TEO. Next, a capacity control current for the compressor is calculated based upon the above deviation. The capacity control current is delivered to a capacity varying device of the compressor to thereby variably controlling the discharge capacity of the compressor. This allows the compressor to increase or decrease its discharge flow rate of refrigerant and control the cycle low pressure (evaporation pressure of refrigerant), thereby maintaining the evaporator blowing temperature Te at or near the target evaporator temperature TEO.

The aforementioned system relates to a single air conditioner that only includes an air-conditioning unit on the front seat side in the passenger compartment as a unit for air-conditioning the passenger compartment. Since this single air conditioner is provided with only one evaporator in the refrigeration cycle, the aforementioned capacity control raises no significant problem.

However, performance and results are different when the refrigeration cycle is of a dual air conditioner type in which an air-conditioning unit is disposed both on the front and rear seat sides in the passenger compartment as units for air-conditioning the passenger compartment. In this case, since the evaporator of the front seat air-conditioning unit and the evaporator of the rear seat air-conditioning unit are arranged in parallel with a compressor and commonly use a condenser, the refrigerant discharged from the one variable capacity compressor is circulated in parallel through the front and rear seat evaporators.

In the refrigeration cycle of the dual air conditioner type, the front seat air-conditioning unit is usually regarded as the main air-conditioning unit. In this context, the inventors of the present invention first built and studied a prototype of a system that provides capacity control to the variable capacity compressor in accordance with the deviation between the actual evaporator blowing temperature Tef and the target evaporator temperature TEO at the front seat evaporator.

As a result, it was found that a worsened distribution balance between the refrigerant flow rate for the front seat evaporator and that for the rear seat evaporator led to a lack in refrigerant flow rate of the rear seat evaporator, thereby causing a significant increase in the temperature of air blown into the rear seat area when compared with the front seat area. This makes a passenger in the rear air-conditioned seat feel less comfortable.

More specifically, an intermediate season such as the spring or fall season requires less cooling heat load for the vehicle air-conditioning system due to lower temperatures of outside air than in the summer season as well as less need for defogging of the windshield of the motor vehicle than in the winter season. In this context, the air-conditioning system employs power saving control (economy control) in which during the intermediate seasons, the target evaporator temperature TEO is set at a temperature higher than during the summer (e.g., by about 11° C.) to reduce the discharge capacity of the compressor thereby reducing the power for driving the compressor.

During this power saving control operation, the discharge capacity of the compressor is reduced thereby causing a decrease in the flow rate of a refrigerant circulating within the cycle. In this case, like a recreational vehicle of minivan type, a vehicle having a rear seat area larger than a front seat area in the passenger compartment space has generally a higher cooling heat load on the rear seat side than on the front seat side. However, from the viewpoint of cooling capability, the front seat evaporator, which is always used, is designed to have a larger capability than that of the rear seat evaporator. Accordingly, the front seat evaporator is greater in capacity than the rear seat evaporator, and the pressure loss in a front seat expansion valve is less than the pressure loss in the capacity of the rear seat evaporator.

During the power saving control operation, this may result in an extremely reduced flow rate of the refrigerant circulating through the rear seat evaporator, thereby causing the temperature of air blown into the rear seat area to be significantly increased, e.g., by about 8° C. when compared with the front seat area and thus leading to a lack in cooling of the rear seat area.

On the other hand, the inventors also studied a vehicle air-conditioning system of the dual air conditioner type which employs as its compressor not a variable capacity compressor but a motor driven compressor that is capable of using RPM control for the control of its discharge flow rate of refrigerant. The study showed that this system also had the problem of the temperature of air blown into the rear seat being significantly increased relative to the temperature of air blown into the front seat at a low flow rate of refrigerant.

SUMMARY OF THE INVENTION

The present invention was developed in view of the aforementioned problems. It is therefore an object of the present invention to provide a vehicle air-conditioning system of the dual air conditioner type which comprises a front seat air-conditioning unit for air-conditioning the front seat side in the passenger compartment and a rear seat air-conditioning unit for air-conditioning the rear seat side in the passenger compartment, with an evaporator of the front seat air-conditioning unit and an evaporator of the rear seat air-conditioning unit being connected in parallel. The air-conditioning system is designed to prevent a significant increase in the temperature of air blown into the rear seat area at a low flow rate of refrigerant when compared with the temperature of air blown into the front seat area.

To achieve the aforementioned object, a first aspect of the present invention is a vehicle air-conditioning system in which a front seat evaporator and a rear seat evaporator are connected in parallel to each other in a refrigeration cycle, allowing one compressor to circulate a refrigerant through the front seat evaporator and the rear seat evaporator, the compressor allowing its discharge flow rate of the refrigerant to be controlled by an external control signal. The system further comprises control means for receiving sensor signals from front seat evaporator temperature sensor means and rear seat evaporator temperature sensor means to control a discharge flow rate of the refrigerant from the compressor. The system is characterized in that a discharge flow rate of the refrigerant from the compressor is controlled in accordance with the higher evaporator temperature of temperatures at the front seat evaporator and the rear seat evaporator and a target evaporator temperature.

According to this aspect of the invention in which the temperature at the rear seat evaporator is higher than that at the front seat evaporator, it is possible to control the discharge flow rate of the refrigerant from the compressor such that the temperature at the rear seat evaporator is equal to the target evaporator temperature. Accordingly, even when the temperature of air blown into the rear seat area is to become higher than the temperature of air blown into the front seat area at a low flow rate of refrigerant, the discharge flow rate of the refrigerant from the compressor can be increased to prevent an increase in the temperature of air blown into the rear seat area.

A second aspect of the present invention is a vehicle air-conditioning system in which a front seat evaporator and a rear seat evaporator are connected in parallel to each other in a refrigeration cycle, allowing one compressor to circulate a refrigerant through the front seat evaporator and the rear seat evaporator, the compressor allowing its discharge flow rate of the refrigerant to be controlled by an external control signal. The system further comprises control means for receiving sensor signals from front seat evaporator temperature sensor means and rear seat evaporator temperature sensor means to control a discharge flow rate of the refrigerant from the compressor. The system is characterized in that a discharge flow rate of the refrigerant from the compressor is controlled only in accordance with a temperature at the front seat evaporator within a range of a high cooling heat load operation, while within a range of a low cooling heat load operation, a discharge flow rate of the refrigerant from the compressor is controlled in accordance with the higher evaporator temperature of temperatures at the front seat evaporator and the rear seat evaporator and a target evaporator temperature.

This also makes it possible to increase the discharge flow rate of the refrigerant from the compressor and thereby prevent an increase in the temperature of air blown into the rear seat area even when the temperature of air blown into the rear seat area is to increase within a range of a low cooling heat load operation (at a low flow rate of the refrigerant).

Since the temperature of air blown into the rear seat area would hardly be increased within a range of a high cooling heat load operation (at a high flow rate of refrigerant), no problem would occur even by the discharge flow rate of the refrigerant from the compressor being controlled only in accordance with the temperature at the front seat evaporator. Rather, the discharge flow rate of the refrigerant from the compressor could be controlled only in accordance with the temperature at the front seat evaporator to prevent an increase in the drive power of the compressor caused by an increase in the temperature at the rear seat evaporator.

A third aspect of the present invention based on the first or second aspect is a vehicle air-conditioning system in which the compressor is controlled to provide the refrigerant at a discharge flow rate of about zero when the lower evaporator temperature of temperatures at the front seat evaporator and the rear seat evaporator has dropped to a predetermined frost determination temperature.

This makes it possible to positively prevent the extension of the freezing at the evaporator having the lower temperature of temperatures at the front seat evaporator and the rear seat evaporator.

According to a fourth aspect of the present invention, by way of example, the compressor can be a variable capacity compressor which can vary its discharge capacity such that the discharge capacity of the variable capacity compressor is varied to thereby change the discharge flow rate of refrigerant.

According to a fifth aspect of the present invention, by way of example, the compressor can be a motor driven compressor which is driven by a motor such that the RPM of the motor is controlled to thereby vary the discharge flow rate of refrigerant.

According to a sixth aspect of the present invention, the target evaporator temperature can be determined at least in accordance with the target blowing temperature of air blown into the passenger compartment from the front seat air-conditioning unit and the temperature of outside air.

Incidentally, the parenthesized numerals accompanying the foregoing individual means show an example of correspondence with concrete means seen in the embodiments to be described later.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

[First Embodiment]

Figure 1:
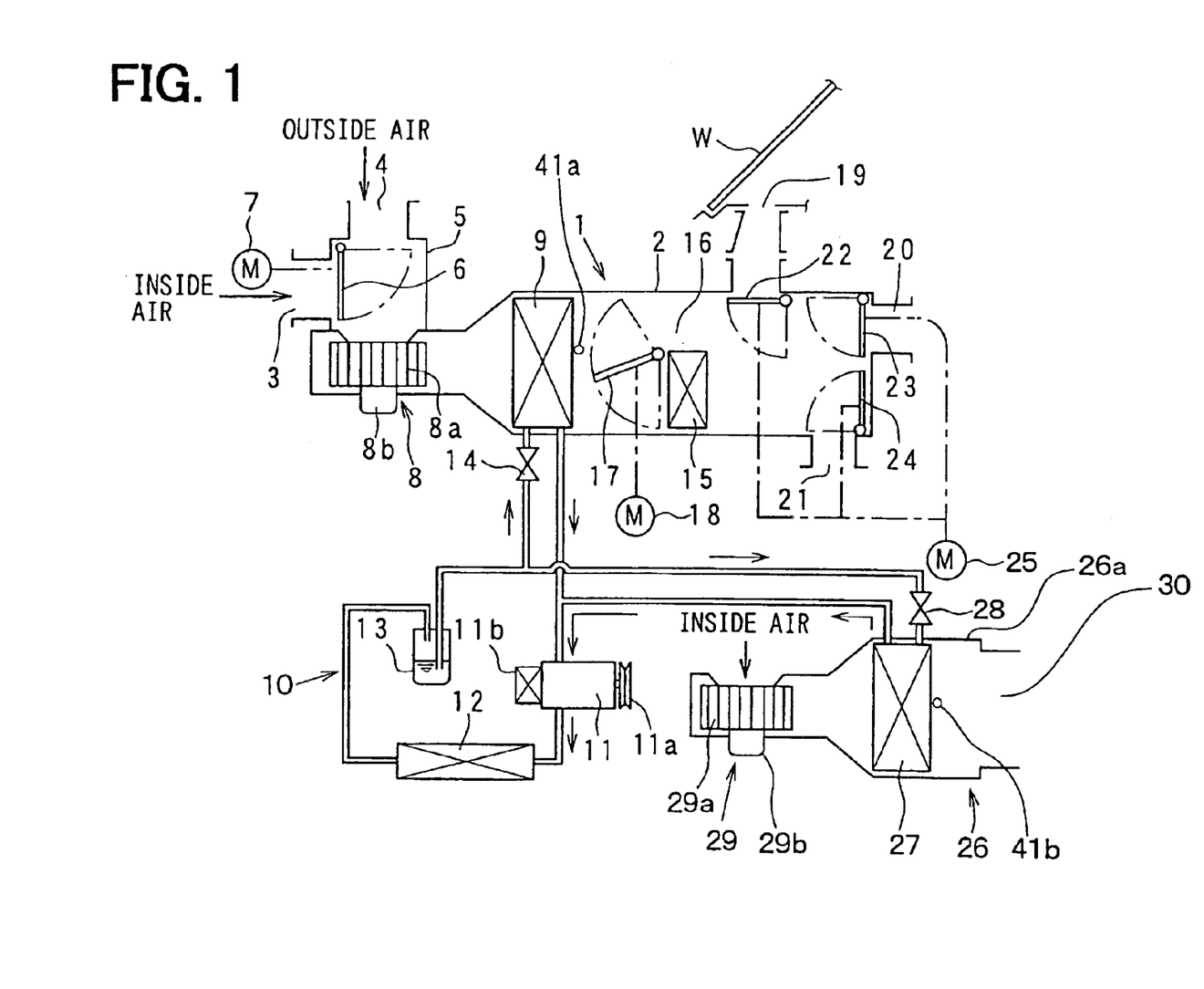
FIG. 1 is a schematic view illustrating the overall configuration of a vehicle air-conditioning system according to a first embodiment of the present invention.

FIG. 1 is a schematic view illustrating the overall configuration of a vehicle air-conditioning system according to a first embodiment. The air-conditioning system comprises a front seat air-conditioning unit 1 and a rear seat air-conditioning unit 26, which serve as units for air-conditioning a passenger compartment. The front seat air-conditioning unit 1 is disposed behind an instrument panel (not shown) at the front most part of the passenger compartment to air-condition the front seat area in the passenger compartment.

The front seat air-conditioning unit 1 has a casing 2, in which an air passageway through which air is blown toward the front seat side in the passenger compartment is defined. At the upstream most part of the air passageway in the casing 2, there is disposed an inside/outside air switching box 5 having an inside air inlet port 3 and an outside air inlet port 4. In the inside/outside air switching box 5, an inside/outside air switching door 6 is rotatably disposed as inside/outside air switching means.

The inside/outside air switching door 6, which is driven by a servo motor 7, switches between an inside air inlet mode during which inside air (air inside the passenger compartment) is introduced from the inside air inlet port 3 and an outside air inlet mode during which outside air (air outside the passenger compartment) is introduced from the outside air inlet port 4.

Downstream of the inside/outside air switching box 5, there is disposed a motor driven front seat air blower 8 for generating an airflow to be directed into the passenger compartment. The air blower 8 has an air blower fan 8a of a centrifugal type that is driven by a motor 8b. Downstream of the air blower 8, there is disposed a front seat evaporator 9 for flowing cooling air through the casing 2. The evaporator 9, which serves as a cooling heat exchanger for cooling air blown from the air blower 8, is one of the components that constitute a refrigeration cycle 10.

The refrigeration cycle 10 has a well-known configuration in which a refrigerant circulates from the discharge side of a compressor 11 through a condenser 12, a liquid reservoir 13, and an expansion valve 14, serving as front seat pressure-reducing means, to the front seat evaporator 9. Between the outlet port side of the liquid reservoir 13 and the suction side of the compressor 11, there are also disposed an expansion valve 28, serving as rear seat pressure-reducing means, and a rear seat evaporator 27 in parallel to the front seat expansion valve 14 and the front seat evaporator 9, so that the refrigerant circulates in parallel through the front seat evaporator 9 and the rear seat evaporator 27.

The compressor 11 is rotatably driven by the rotational power of a motor vehicle engine (not shown) being transferred thereto via an electromagnetic clutch 11a and a belt, etc. Furthermore, this embodiment employs, as the compressor 11, an externally variable capacity compressor that allows an external control signal to continuously vary its discharge capacity.

For example, the externally variable capacity compressor 11, which is well known to those skilled in the art, comprises a capacity varying device 11b with an electromagnetic pressure control unit, which utilizes the discharge pressure and the suction pressure of a swash plate compressor to control the pressure in the swash plate chamber. The capacity varying device 11b can be used to control the pressure of the swash plate chamber, thereby varying the angle of inclination of the swash plate to continuously vary the stroke of a piston or the discharge capacity of the compressor within the range of about 0% to 100%.

The electromagnetic pressure control unit of the capacity varying device 11b, designed to utilize the discharge pressure and the suction pressure of the compressor 11 to vary the control pressure (pressure in the swash plate chamber), comprises an electromagnetic mechanism for allowing a control current In (shown in FIG. 2) to adjust the electromagnetic force and a valve body to be displaced by the balance between the electromagnetic force of the electromagnetic mechanism and the suction pressure. The valve body is designed to adjust the pressure loss in the passageway through which the discharge pressure of the compressor 11 is transferred into the swash plate chamber, thereby varying the control pressure.

Figure 2:
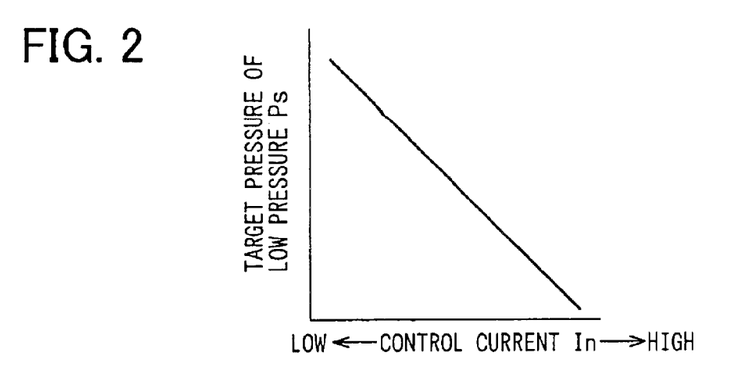
FIG. 2 is a diagram illustrating a control characteristic of a variable capacity compressor employed in the first embodiment.

The electromagnetic pressure control unit of the capacity varying device 11b is controllably energized by means of the output from an air-conditioning control unit 40 (shown in FIG. 3 and discussed later), e.g., such that an increase in the control current In of the capacity varying device 11b causes the discharge capacity of the compressor to increase. That is, the control current In of the capacity varying device 11b directly determines a target pressure of a low pressure (suction pressure) Ps in the refrigeration cycle. Since the target pressure of the low pressure Ps drops as shown in FIG. 2 in inverse proportion to an increase in the control current In, an increase in the control current In results in an increase in the discharge capacity of the compressor.

Accordingly, an increase or a decrease in the control current In causes the discharge capacity of the compressor 11 and thus the discharge flow rate of refrigerant to be increased or decreased, thereby raising or lowering an actual low pressure Ps. This makes it possible to control the cooling capability of the front seat evaporator 9 such that the temperature of the front seat evaporator 9 (the temperature of air blown from the evaporator) is equal to a predetermined target temperature (the temperature corresponding to the target pressure of the low pressure Ps). Here, more specifically, the control current In can be varied through duty control operation, however, the value of the control current In may also be directly increased or decreased in succession not by means of the duty control operation.

In the refrigeration cycle 10, the compressor 11 compresses the refrigerant to a high-temperature and high-pressure to discharge a high-pressure gas refrigerant, which is in turn introduced into the condenser (heat radiator) 12. In the condenser 12, the gas refrigerant exchanges heat with the outside air blown by a cooling fan (not shown), thus radiating heat to be thereby condensed. The refrigerant having passed through the condenser 12 is separated into a liquid phase refrigerant and a gas phase refrigerant at the liquid reservoir 13, while the liquid phase refrigerant is stored in the liquid reservoir 13.

The front seat temperature-controlled expansion valve 14 reduces the high-pressure liquid refrigerant from the liquid reservoir 13 to a low-pressure refrigerant of two liquid and gas phases, which is in turn allowed to absorb heat from conditioned air in the aforementioned front seat evaporator 9 to thereby vaporize.

As is well known to those skilled in the art, the front seat temperature-controlled expansion valve 14 automatically adjusts the degree of valve opening such that the degree of superheating of refrigerant is maintained at a predetermined value at the outlet port of the front seat evaporator 9. Accordingly, the temperature-controlled expansion valve 14 comprises a temperature sensor portion for sensing the temperature of refrigerant at the outlet port of the front seat evaporator 9, a first pressure chamber to which a pressure is applied corresponding to the refrigerant temperature sensed by the temperature sensor portion, a second pressure chamber to which the refrigerant pressure in the evaporator 9 (low cycle pressure) is applied, and a diaphragm for providing a partition between the first and second pressure chambers. With this arrangement, the front seat temperature-controlled expansion valve 14 allows the diaphragm and the valve body to be displaced in response to the difference in pressure between the first and second pressure chambers and a spring-biased force, thereby adjusting the refrigerant flow rate.

The gas refrigerant having vaporized in the front seat evaporator 9 is introduced into the compressor 11 again to be compressed. The devices such as the compressor 11, the condenser 12, and the liquid reservoir 13 in the refrigeration cycle 10 are disposed within the engine room of the motor vehicle (not shown).

Like the front seat temperature-controlled expansion valve 14, the rear seat temperature-controlled expansion valve 28 provided at a refrigerant inlet portion of the rear seat evaporator 27 is configured to automatically adjust the degree of valve opening such that the degree of superheating of refrigerant is maintained at a predetermined value at the outlet port of the rear seat evaporator 27. The rear seat temperature-controlled expansion valve 28 reduces the high-pressure liquid refrigerant from the liquid reservoir 13 to a low-pressure refrigerant of two liquid and gas phases, which is in turn introduced into the rear seat evaporator 27.

On the other hand, in the front seat air-conditioning unit 1, downstream of the front seat evaporator 9, there is disposed a front seat heater core 15 for heating air flowing through the casing 2. The heater core 15 is a heating heat exchanger which employs hot water in the motor vehicle engine (engine coolant water) as a heat source to heat air (cooled air) having passed through the front seat evaporator 9. On a side of the heater core 15, there is defined a bypass passageway 16 through which air flows bypassing the heater core 15.

Between the evaporator 9 and the heater core 15, rotatably disposed is an air mix door 17. The air mix door 17 is driven by means of a servomotor 18 such that the rotational position (the degree of opening) of the air mix door 17 can be continuously adjusted. The air mix door 17 allows its degree of opening to adjust the volume of air (the volume of hot air) passing through the heater core 15 and the volume of air (the volume of cooled air) passing through the bypass passageway 16 and bypassing the heater core 15, thereby providing control to the temperature of air blown into the front seat side in the passenger compartment.

At the downstream most part of the air passageway in the casing 2, there are provided a total of three types of blowing openings, i.e., a defroster blowing opening 19 for blowing conditioned air toward the front windshield W of the motor vehicle, a front seat face blowing opening 20 for blowing conditioned air toward the face portion of a front seat passenger, and a front seat foot blowing opening 21 for blowing conditioned air toward the foot portion of the front seat passenger.

Upstream of these blowing openings 19 to 21, there are rotatably disposed a defroster door 22, a front seat face door 23, and a front seat foot door 24. These doors 22 to 24 are driven by means of a common servomotor 25 via a linkage mechanism (not shown).

Now, the rear seat air-conditioning unit 26 will be described below. The rear seat air-conditioning unit 26 is disposed at a rear side portion in the passenger compartment so as to air-condition the rear seat area in the passenger compartment. The rear seat air-conditioning unit 26 has a casing 26a that defines an air passageway, with a rear seat air blower 29 being disposed upstream of the casing 26a to draw and then blow inside air (air inside the passenger compartment). The rear seat air blower 29 has an air blower fan 29a of a centrifugal type driven by a motor 29b. Downstream of the rear seat air blower 29, disposed is the aforementioned rear seat evaporator 27 to cool the air flowing through the casing 26a.

The rear seat air-conditioning unit 26 according to this embodiment, configured as a cooling unit without an air heating function, has only a rear seat face blowing opening 30 provided downstream of the air passageway in the rear seat evaporator 27, such that conditioned air is blown toward the face portion of a rear seat passenger from the blowing opening of a rear seat face duct (not shown) connected to the blowing opening 30.

The rear seat air-conditioning unit 26 may also be provided with the air heating function. In this case, a rear seat heater core (not shown) which employs the hot water for the motor vehicle engine as a heat source to heat air may be disposed downstream of the rear seat evaporator 27. Furthermore, in addition to the rear seat face blowing opening 30, a rear seat foot blowing opening for blowing conditioned air toward the foot portion of a rear seat passenger may also be provided downstream of the rear seat heater core or at the downstream most part of the air passageway in the casing 26a. With this arrangement, the rear seat face blowing opening 30 and the rear seat foot blowing opening may be opened or closed.

Figure 3:
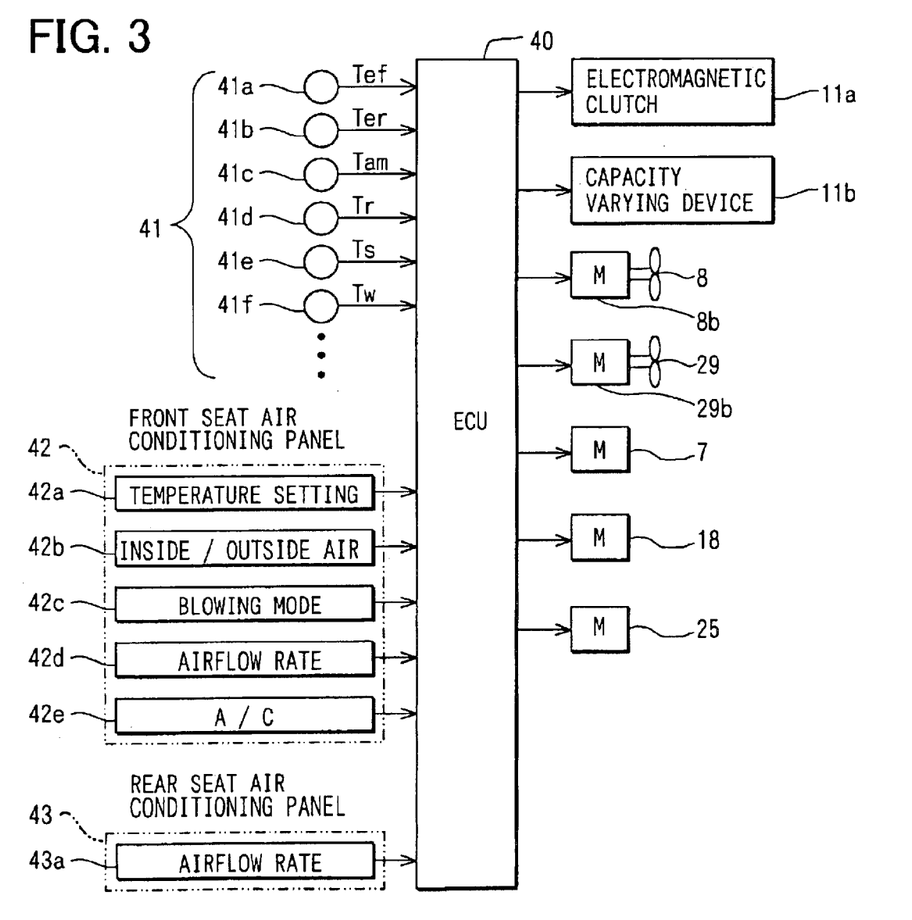
FIG. 3 is a schematic block diagram illustrating an electrical control portion according to the first embodiment.

Now, the electrical control portion in this embodiment will be explained briefly with reference to FIG. 3. The air-conditioning control unit 40, serving as the control means of the present invention, comprises a known microcomputer having a CPU, ROM, RAM, etc., and its peripheral circuits. The air-conditioning control unit 40 has an air-conditioning control program stored in the ROM and performs various types of arithmetic operations and processing in accordance with the control program. The air-conditioning control unit 40 receives, at its input side, sensor-sensed signals from a group of sensors 41, a control signal from a front seat air-conditioning panel 42, and a control signal from a rear seat air-conditioning panel 43.

The group of sensors 41 includes a front seat evaporator temperature sensor 41a, disposed at the air blowing portion of the front seat evaporator 9, for sensing a front seat evaporator blowing air temperature Tef, and a rear seat evaporator temperature sensor 41b, disposed at the air blowing portion of the rear seat evaporator 27, for sensing a rear seat evaporator blowing air temperature Ter. With this arrangement, the air-conditioning control unit 40 variably controls the discharge capacity of the compressor 11 in response to the front and rear seat evaporator blowing air temperatures Tef and Ter sensed by the respective temperature sensors 41a and 41b, thereby providing control to the cooling capability of both the front and rear evaporators 9 and 27.

In addition to the evaporator temperature sensors 41a and 41b, the air-conditioning control unit 40 also comprises various types of sensors 41c to 41f for sensing an outside air temperature Tam, an inside air temperature Tr, the amount of solar radiation Ts, and a hot water temperature Tw. The inside air temperature sensor 41d is disposed in the front seat area in the passenger compartment to sense the inside air temperature Tr on the front seat side in the passenger compartment. The solar radiation sensor 41e is also disposed in the front seat area in the passenger compartment to sense the amount of solar radiation Ts on the front seat side in the passenger compartment.

The front seat air-conditioning panel 42, disposed near the instrument panel (not shown) in front of the driver seat in the passenger compartment, has the following control switches 42a to 42e that are manually operated by a passenger. The temperature setting switch 42a delivers a set point temperature signal for the front seat side in the passenger compartment, while the inside/outside air changeover switch 42b delivers a signal for manually selecting either the inside air mode or the outside air mode using the inside/outside air switching door 6.

The blowing mode switch 42c delivers a signal for manually selecting a front seat blowing mode from among a face mode, a bi-level mode, a foot mode, a foot defroster mode, and a defroster mode, which are known to those skilled in the art. The airflow rate changeover switch 42d delivers a signal for manually turning ON or OFF the front seat air blower 8 or selecting the airflow rate of the front seat air blower 8. The air conditioner switch 42e delivers a signal for turning ON or OFF the electromagnetic clutch 11a to switch the operation of the compressor 11.

On the other hand, the rear seat air-conditioning panel 43, disposed such as in a rear seat area in the passenger compartment, comprises a rear seat airflow rate changeover switch 43a. The switch 43a delivers a signal for manually turning ON or OFF the rear seat air blower 29 or selecting the airflow rate of the rear seat air blower 29. Here, the control signal for switching the rear seat airflow rate may also be entered at the front seat air-conditioning panel 42.

The air-conditioning control unit 40 is connected, on its output side, with the electromagnetic clutch 11a and the capacity varying device 11b of the compressor 11, the servo motors 7, 18, 25 serving as electrical drive means for each component, the motor 8b of the front seat air blower 8, the motor 29b of the rear seat air blower 29, etc. With this arrangement, the operations of these components are controlled with the signal delivered from the air-conditioning control unit 40.

Now, the operation of this embodiment will be described with reference to the aforementioned arrangement. First, a brief explanation is given to the operation performed as a vehicle air-conditioning system. First, to operate both the front seat air-conditioning unit 1 and the rear seat air-conditioning unit 26, turn ON the airflow rate changeover switch 42d at the front seat air-conditioning panel 42 and the airflow rate changeover switch 43a at the rear seat air-conditioning panel 43 to activate both the front and rear air blowers 8, 29, thereby allowing air to be blown into both the air-conditioning units 1 and 26.

Then, turn ON the air conditioner switch 42e serving as a switch for activating the compressor at the front seat air-conditioning panel 42, and the air-conditioning control unit 40 energizes the electromagnetic clutch 11a thereby causing the electromagnetic clutch 11a to be brought into engagement, so that the compressor 11 is rotatably driven by the motor vehicle engine. Additionally, the air-conditioning control unit 40 determines the control current In for the capacity varying device 11b of the compressor 11 in accordance with the control flowchart of FIG. 4, discussed later, so that the compressor 11 operates at a predetermined discharge capacity.

This allows a refrigerant to circulate in parallel through the front and rear evaporators 9, 27 in the refrigeration cycle 10. This makes it possible for the front seat air-conditioning unit 1 to allow the evaporator 9 to cool and dehumidify airflow to produce conditioned air, which is in turn blown into the front seat side space in the passenger compartment. Likewise, the rear seat air-conditioning unit 26 also allows the evaporator 27 to cool and dehumidify airflow to produce conditioned air, which is then blown into the rear seat side space in the passenger compartment.

Suppose that both the front and rear air-conditioning units 1, 26 are simultaneously operating as described above. In this case, the front and rear temperature-controlled expansion valves 14, 28 are adjusted to the degree of valve opening corresponding to the cooling heat load of the respective front and rear evaporators 9, 27, allowing the refrigerant to always pass through the flow passage in each of the evaporators 9, 27 at the flow rate corresponding to the cooling heat load. This allows the degree of superheating of refrigerant to be adjusted to a predetermined value at the outlet port of each of the evaporators 9, 27.

Now, suppose that the rear seat air-conditioning unit 26 is at a standstill allowing only the front seat air-conditioning unit 1 to operate. In this case, turn ON only the front seat airflow rate changeover switch 42d, with the rear seat airflow rate changeover switch 43a being in the OFF position. This allows the rear seat air blower 29 to stop and no air to be supplied to the rear seat evaporator 27, thereby causing the refrigerant at the outlet port of the rear seat evaporator 27 to be saturated corresponding to the ambient temperature and thus have no degree of superheating.

As a result, the rear seat temperature-controlled expansion valve 28 is closed or otherwise nearly closed to stop the refrigerant from circulating through the rear seat evaporator 27 in the refrigeration cycle 10, allowing the refrigerant to circulate only through the front seat evaporator 9.

Now, the capacity control of the compressor 11 will be described with reference to FIG. 4, which shows a control routine to be executed by the air-conditioning control unit 40. In step S100, the process reads sensor signals from the group of sensors 41 and control signals from the air-conditioning panels 42, 43. Then, in step S110, the process calculates a target blowing temperature TAO of air blown from the front seat air-conditioning unit 1 into the front seat side in the passenger compartment. The target blowing temperature TAO is the temperature of air blown into the front seat side in the passenger compartment that is required to keep the front seat side in the passenger compartment at a set point temperature Tset irrespective of a variation in air-conditioning heat load. As is known to those skilled in the art, TAO is calculated in accordance with the set point temperature Tset provided by the temperature setting switch 42a for the front seat side in the passenger compartment, and the outside air temperature Tam, the inside air temperature Tr, and the amount of solar radiation Ts, which are sensed by the respective sensors 41c to 41e.

Then, in step S120, the process calculates the target evaporator temperatures TEO of the front seat evaporator 9 and the rear seat evaporator 27. The TEO, a target temperature of air blown from the front seat evaporator 9 and the rear seat evaporator 27, is determined as in the following equation 1 in accordance with the aforementioned TAO, the outside air temperature Tam, etc.

[Equation 1]

$$TEO = MIN\{f1(Tam), f2(TAO)\}$$

That is, the lower temperature of the first target evaporator temperature f1(Tam) and the second target evaporator temperature f2(TAO) is determined as the target evaporator temperature TEO.

Figure 5A:
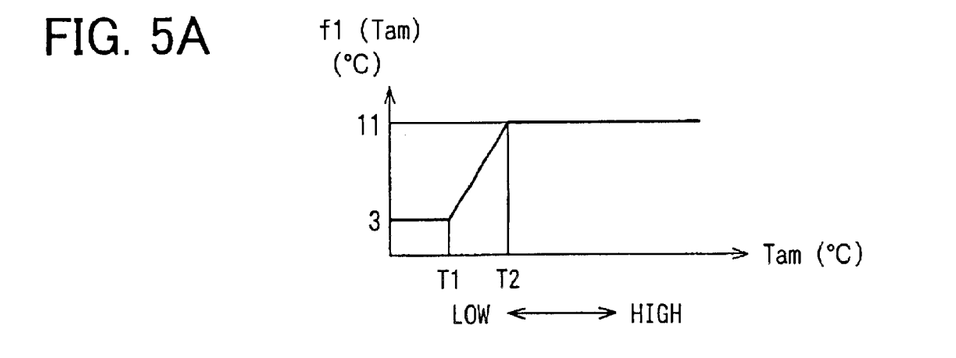
FIG. 5 is a view illustrating various control characteristic diagrams to explain the operation of the flowchart of FIG. 4.

In the foregoing, the first target evaporator temperature f1(Tam) is determined depending on the outside air temperature Tam as shown in FIG. 5(a). More specifically, an increase in the outside air temperature Tam from a first predetermined intermediate temperature T1 (e.g., about 8° C.) would cause the first target evaporator temperature f1(Tam) to gradually increase from the lowest temperature (e.g., 3° C.). When the outside air temperature Tam has reached a second predetermined intermediate temperature T2 (e.g., about 17° C.), the first target evaporator temperature f1(Tam) is equal to the highest temperature (e.g., 11° C). This makes it possible to reduce the power of the compressor over the intermediate temperature range.

The first target evaporator temperature f1(Tam) is equal to the lowest temperature (e.g., 3° C.) during a low outside air temperature at which the outside air temperature Tam is lower than the first intermediate temperature T1. This is to ensure the dehumidifying capability of the evaporator for preventing the fogging of the windshield during the low outside air temperature.

Figure 5B:
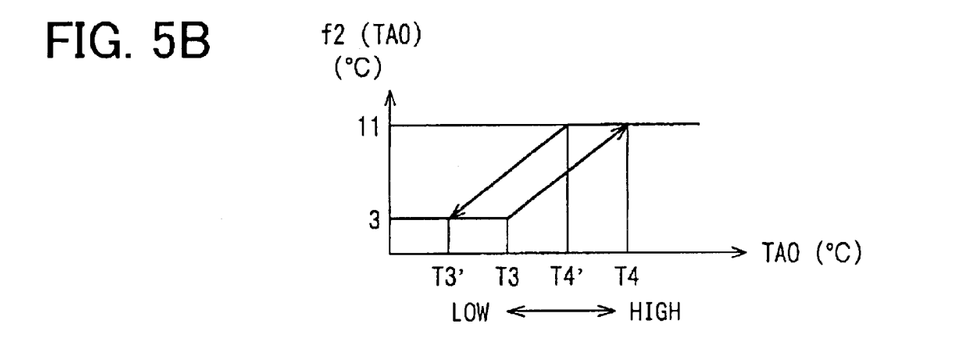

On the other hand, as shown in FIG. 5(b), the second target evaporator temperature f2(TAO) is determined so as to increase in response to an increase in the target blowing temperature TAO. More specifically, an increase in the target blowing temperature TAO from a first predetermined temperature T3 (e.g., about 7° C.) would cause the second target evaporator temperature f2(TAO) to gradually increase from the lowest temperature (e.g., 3° C.). When the target blowing temperature TAO has reached a second predetermined temperature T4 (e.g., about 20° C.), the second target evaporator temperature f2(TAO) is equal to the highest temperature (e.g., 11° C.).

In FIG. 5(b), predetermined temperatures T3' and T4' are lower than the first and second predetermined temperatures T3 and T4, respectively.

Now, in step S130, the process determines whether the rear seat air-conditioning unit 26 is in operation. More specifically, it is determined whether the rear seat air blower 29 is in operation. If the rear seat air blower 29 is in operation, i.e., if both the front and rear seat air-conditioning units 1, 2 are simultaneously in operation, the process proceeds to step S140 to determine which of the front seat evaporator blowing temperature Tef and the rear seat evaporator blowing temperature Ter is higher than the other.

If the rear seat evaporator blowing temperature Ter is higher than the front seat evaporator blowing temperature Tef, the process proceeds to step S150. Conversely, if the front seat evaporator blowing temperature Tef is higher than the rear seat evaporator blowing temperature Ter, the process proceeds to step S160.

Figure 5C:
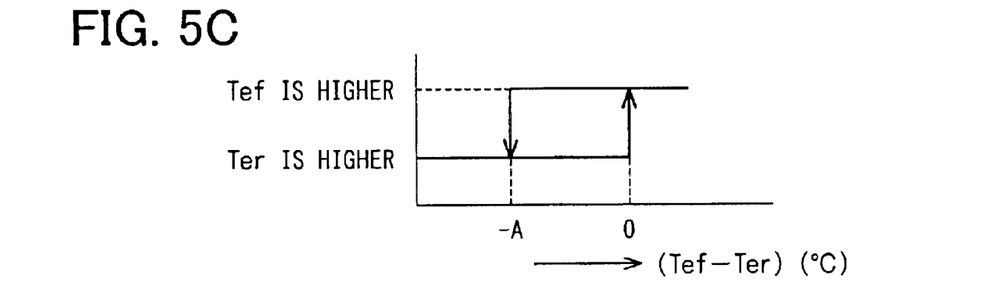

In practice, as shown in FIG. 5(c), the determination is made in step S140 such that the difference between Ter and Tef (i.e., Ter−Tef) exhibits hysteresis. This setting of hysteresis is intended to prevent hunting in the capacity control of the compressor and thereby provide control with stability. For example, the width A of the hysteresis shown in FIG. 5(c) has a value of about 1° C.

If the rear seat evaporator blowing temperature Ter is higher than the front seat evaporator blowing temperature Tef, the process provides regular capacity control to the compressor in step S150 in accordance with the rear seat evaporator blowing temperature Ter. More specifically, the process calculates the control current In to be delivered to the capacity varying device 11b of the compressor 11 in accordance with the rear seat evaporator blowing temperature Ter, allowing the control current In to variably control the capacity of the compressor 11.

In the foregoing, as shown in FIG. 2, the control current In, which determines the target low pressure of the electromagnetic pressure control unit in the capacity varying device 11b of the compressor 11, is determined such that the actual rear seat evaporator blowing temperature Ter sensed by the blowing temperature sensor 41b in the rear seat evaporator 27 is equal to the aforementioned target evaporator temperature TEO.

More specifically, the control current In is calculated as follows. That is, the deviation En between an actual evaporator blowing temperature Ter and the target evaporator temperature TEO (En=Ter−TEO) is first calculated. Then, from the deviation En, the control current In is calculated in accordance with a feedback control technique such as a proportional-plus-integral control method (PI control).

Figure 5D:
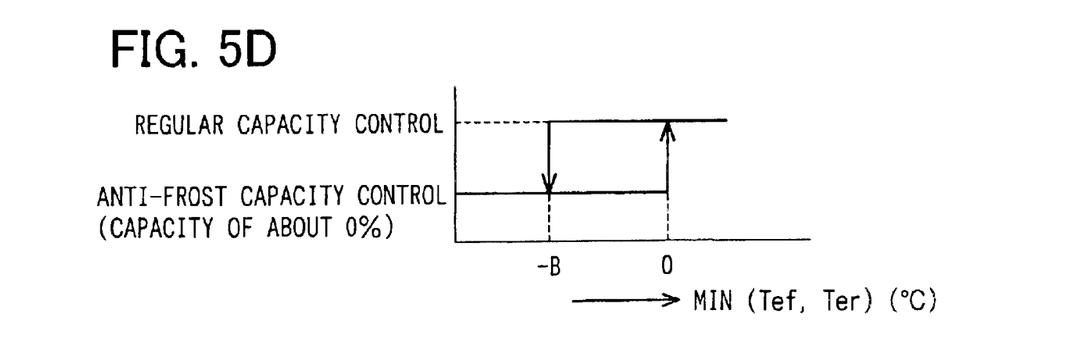

Additionally, in step S150, the process provides anti-frost capacity control in accordance with the front seat evaporator blowing temperature Tef that is lower than the rear seat evaporator blowing temperature Ter. Here, the anti-frost capacity control refers to capacity control for preventing the condensed water produced in the evaporators 9, 27 from being frozen. More specifically, as shown in FIG. 5(d), when the lower temperature of the front seat evaporator blowing temperature Tef and the rear seat evaporator blowing temperature Ter (i.e., the front seat evaporator blowing temperature Tef in step S150) drops to a predetermined frost determination temperature −B° C. (e.g., −4° C.), the process forces the control current In to decrease to its minimum value so as to force the compressor to deliver a capacity of about 0%.

This causes almost no refrigerant to circulate in the refrigeration cycle 10, thereby eliminating most of cooling effect provided by the refrigerant being vaporized in the front seat evaporator 9 and the rear seat evaporator 27. It is thus made possible to prevent the freezing in the front seat evaporator 9 from extending over a wide range, thereby preventing a decrease in the cooling capability of the front seat evaporator 9 caused by the freezing.

In the foregoing, the regular capacity control mentioned with reference to FIG. 5(d) refers to the control provided to variably control the compressor as described above so that the actual evaporator blowing temperature Tef or Ter is equal to the target evaporator temperature TEO.

Now, if the front seat evaporator blowing temperature Tef is higher than the rear seat evaporator blowing temperature Ter, the process proceeds from step S140 to step S160 in order to provide the regular capacity control to the compressor in accordance with the front seat evaporator blowing temperature Tef. More specifically, the process calculates the control current In to be delivered to the capacity varying device 11b of the compressor 11 in accordance with the front seat evaporator blowing temperature Tef. This is done to variably control the capacity of the compressor 11 using the control current In.

Furthermore, instep S160, the process provides the anti-frost capacity control in accordance with the rear seat evaporator blowing temperature Ter that is lower than the front seat evaporator blowing temperature Tef. This anti-frost capacity control is the same as the control operation shown in FIG. 5(d) in the foregoing. When the rear seat evaporator blowing temperature Ter has dropped to the predetermined frost determination temperature −B° C. (e.g., −4° C.), the process forces the control current In to decrease to its minimum value so as to force the compressor to provide a capacity of about 0%.

If it is determined in step S130 that the rear seat air-conditioning unit 26 (the rear seat air blower 29) is at a standstill, the process proceeds to step S170 to provide the regular capacity control to the compressor and the anti-frost capacity control in accordance with the front seat evaporator blowing temperature Tef. The regular compressor capacity control and the anti-frost capacity control are the same as those of steps S150 and S160.

Now, an explanation is given to the action and effects provided by the first embodiment. The intermediate temperature range of the outside air temperature Tam (e.g., about 20° C.) requires less cooling heat load, thereby causing the target blowing temperature TAO of air blown into the passenger compartment to be higher than during the summer season. This in turn causes the second target evaporator temperature f2(TAO) determined in accordance with the target blowing temperature TAO shown in FIG. 5(b) to be approximately equal to the highest temperature of 11° C.

Within the intermediate temperature range of the outside air temperature Tam, the characteristics shown in FIG. 5(a) allow the first target evaporator temperature f1(Tam) to be approximately equal to the highest temperature of 11° C. This in turn causes the target evaporator temperature TEO to be approximately equal to the highest temperature of 11° C. Accordingly, within the intermediate temperature range of the outside air temperature Tam, the process provides the capacity control to the compressor 11 so that the actual evaporator blowing air temperatures Tef and Ter are approximately equal to the highest temperature of 11° C. Since this causes the capacity of the compressor 11 to become lower, it is possible to reduce the drive power of the compressor 11, thus implementing the power saving (economy) control operation.

However, during this power saving control operation, the capacity of the compressor 11 becomes lower to reduce the flow rate of the refrigerant circulating through the cycle. This causes a tremendous decrease in the flow rate of the refrigerant circulating through the rear seat evaporator 27 because of the reason mentioned with reference to the simultaneous operation of the front and rear air-conditioning units 1 and 26. Accordingly, this leads to a problem that the temperature of air blown from the rear seat air-conditioning unit 26 is significantly increased relative to the temperature of air blown from the front seat air-conditioning unit 1.

However, according to the first embodiment, when the comparison between the front and rear evaporator blowing temperatures Tef, Ter shows that the rear seat evaporator blowing temperature Ter is higher than the front seat evaporator blowing temperature Tef, the process provides the capacity control to the compressor 11 in step S150 such that the rear seat evaporator blowing temperature Ter is equal to the target evaporator temperature TEO. This makes it possible to positively control the rear seat evaporator blowing temperature Ter to the target evaporator temperature TEO.

Therefore, even during the power saving control operation, it is possible to eliminate the problem that the temperature of air blown into the rear seat side in the passenger compartment is significantly increased relative to the temperature of air blown into the front seat side in the passenger compartment, thereby preventing a passenger from feeling less comfortable due to air-conditioning provided to the rear seat area in the passenger compartment.

On the other hand, the anti-frost control is provided to the front and rear evaporators 9, 27 as follows. More particularly, when the comparison between the front and rear evaporator blowing temperatures Tef and Ter shows that the lower evaporator blowing temperature has dropped to the predetermined frost determination temperature −B° C. (e.g., −4° C.), since the process forces the compressor 11 to provide a reduced capacity of about 0%, it is possible to positively prevent the freezing from extending in the evaporator of the front and rear evaporators 9, 27 being at the lower temperature.

The first embodiment employs a frost determination temperature of −4° C. or a set point temperature below the ice point in order to ensure the capability of defogging of the windshield provided by the dehumidifying action of the evaporators 9 and 27 at low outside air temperatures during the winter season. A lower outside air temperature during the winter season requires a lower heat load of the evaporators 9, 27 and thus a lower capacity of the compressor as well as a lower flow rate of a refrigerant circulating in the cycle. Additionally, since a lowered absolute humidity of outside air causes the amount of condensed water produced to be reduced, no problem would occur from the viewpoint of preventing the freezing in the evaporators 9, 27 even at a frost determination set point temperature of −4° C.

[Second Embodiment]

Figure 4:
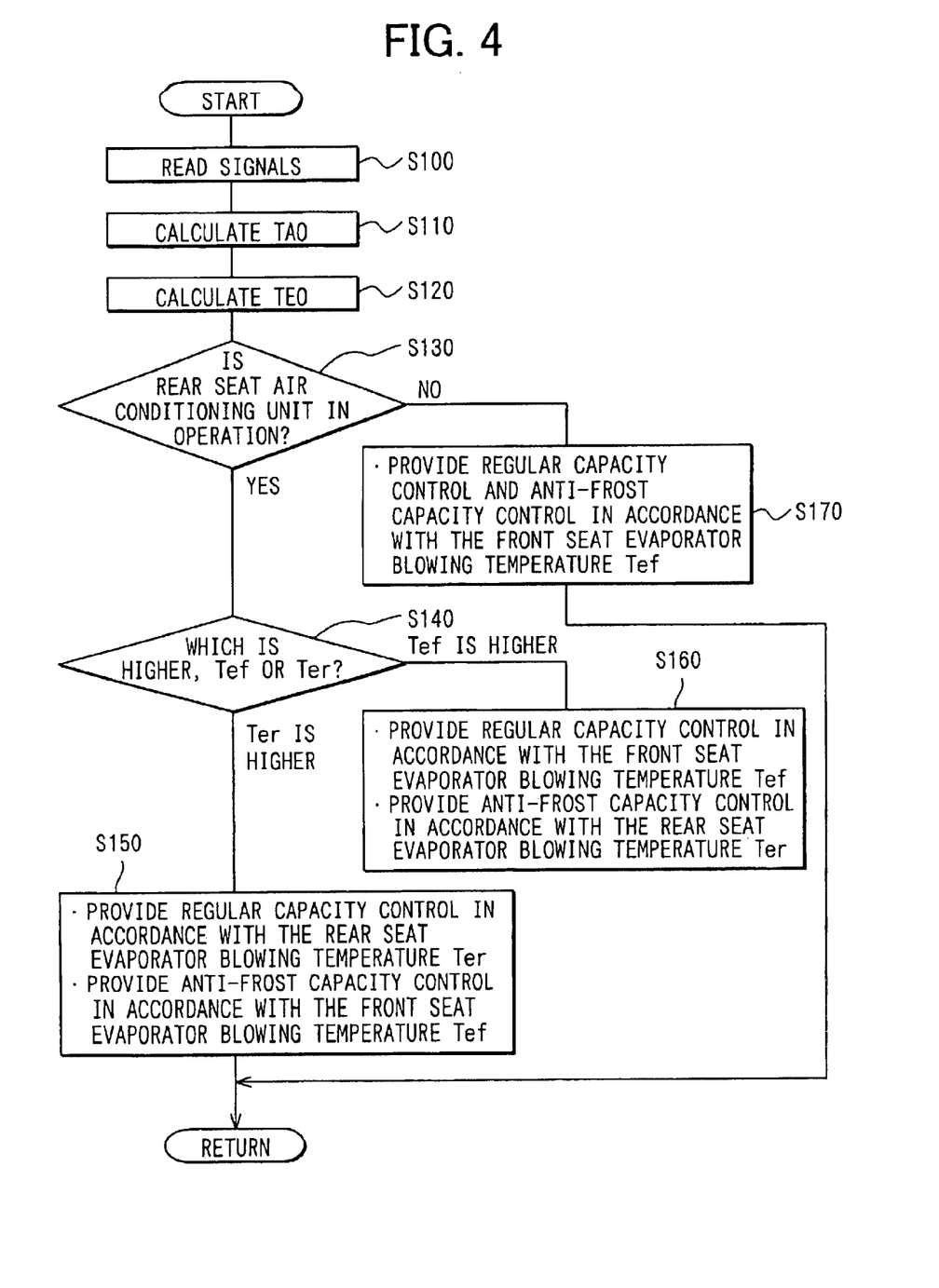
FIG. 4 is a flowchart illustrating the capacity control provided to the variable capacity compressor according to the first embodiment.
Figure 6:
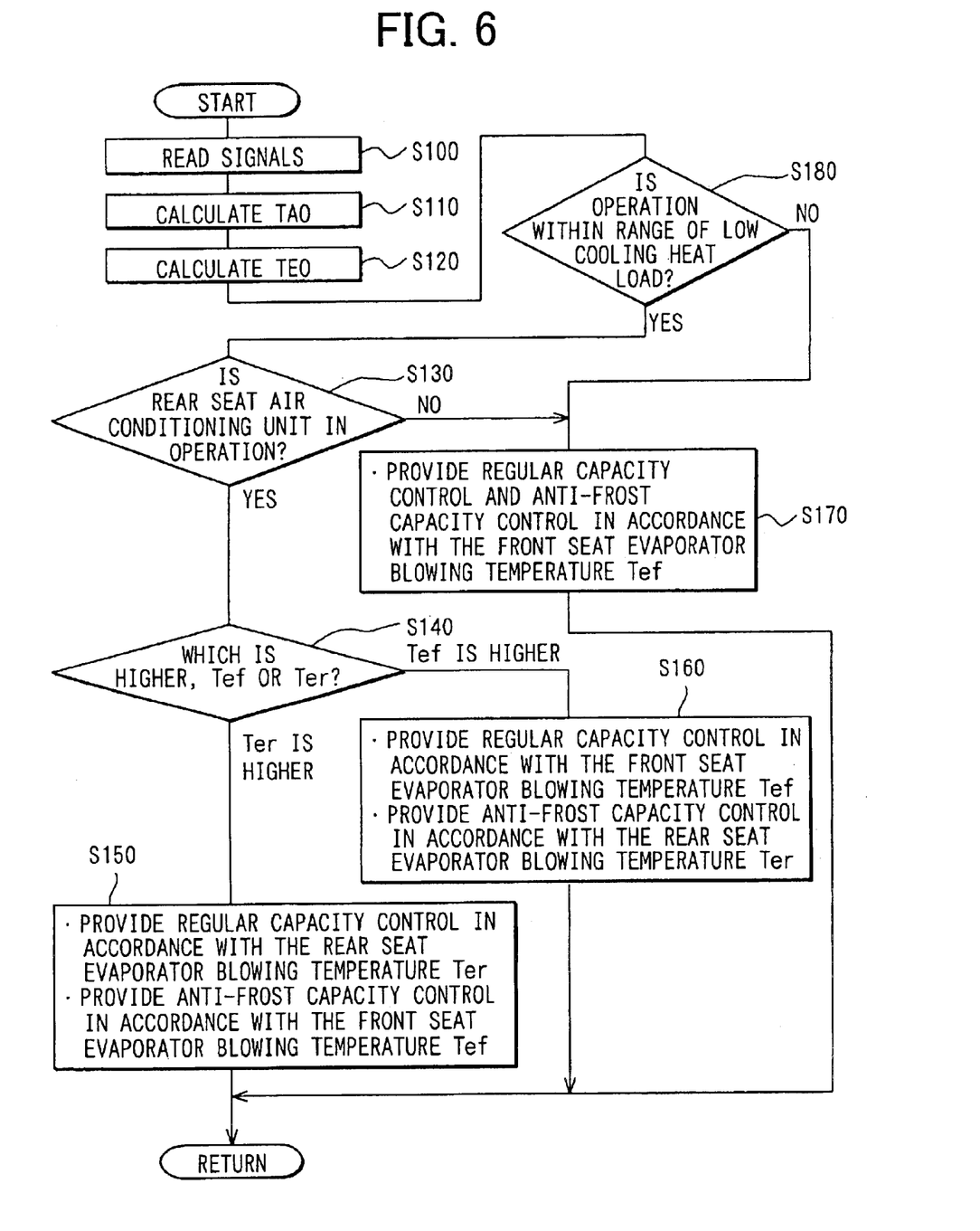
FIG. 6 is a flowchart illustrating the capacity control provided to a variable capacity compressor according to a second embodiment.

FIG. 6 is a flowchart according to a second embodiment, being different from the flowchart of FIG. 4 according to the first embodiment in that step S180 is added between the steps S120 and S130.

In step S180, the process determines whether it is within the range of a low cooling heat load operation (i.e., the range of power saving control operation). Here, the cooling heat load depends on the conditions (temperature and humidity) of the air drawn into the evaporators 9, 27, and the conditions of the air drawn are strongly affected by the outside air temperature Tam. Accordingly, for example, the case of the outside air temperature Tam being equal to, or lower than, a predetermined temperature can be determined as within the range of a low cooling heat load operation.

Within the range of a high cooling heat load operation, the process proceeds from step S180 directly to step S170 in order to provide the regular compressor capacity control and the anti-frost capacity control only in accordance with the front seat evaporator blowing temperature Tef.

In contrast to this, within the range of a low cooling heat load operation, the process proceeds from step S180 to step S130 in order to provide the same capacity control thereafter as in the first embodiment.

That is, according to the second embodiment, within the range of a high cooling heat load operation, the process always provides the capacity control to the compressor 11 only in accordance with the front seat evaporator blowing temperature Tef. Accordingly, even with the rear seat evaporator blowing temperature Ter being higher than the front seat evaporator blowing temperature Tef, the process provides the capacity control to the compressor 11 in accordance with the front seat evaporator blowing temperature Tef. Therefore, no increase in the capacity of the compressor 11 (no increase in the power of the compressor) that would be otherwise caused by an increase in the rear seat evaporator blowing temperature Ter will occur.

As described in the foregoing, within the range of a low cooling heat load operation (the range of power saving control operation), the flow rate of a refrigerant circulating through the rear seat evaporator 27 is tremendously reduced causing a problem of an increase in the temperature of air blown into the rear seat side in the passenger compartment leading to a lack in cooling of the rear seat side. Thus, only within the range of a low cooling heat load operation, the process can also provide the same capacity control as in the first embodiment to substantially eliminate the lack in cooling of the rear seat side.

[Third Embodiment]

Figure 7:
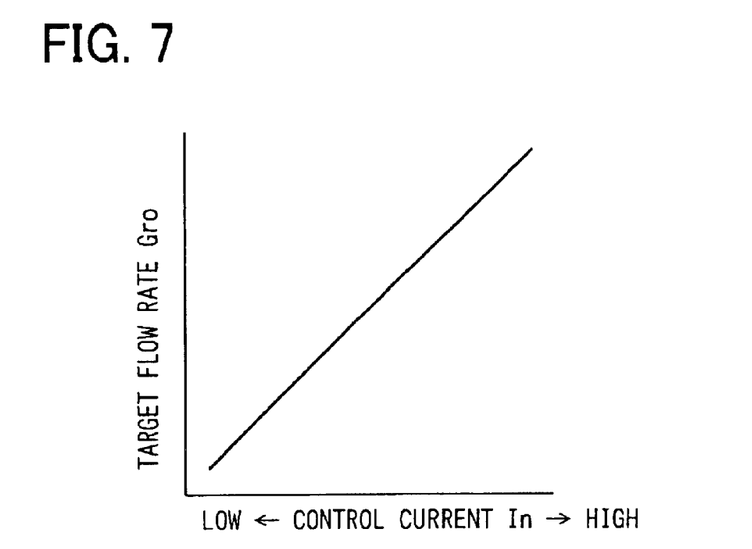
FIG. 7 is a diagram illustrating a control characteristic of a variable capacity compressor according to a third embodiment.

The first and second embodiments employ a compressor of the low-pressure control type, as the external variable capacity compressor 11, which uses the control current In of the capacity varying device 11b to set a target pressure of the low pressure Ps as shown in FIG. 2 and increases or decreases the discharge capacity so that the low pressure Ps is maintained at the target pressure. However, the third embodiment employs a compressor of the discharge flow rate control type, as the external variable capacity compressor 11, which uses the control current In of the capacity varying device 11b to set a target flow rate Gro of the compressor discharge flow rate as shown in FIG. 7 and increases or decreases the discharge capacity so that the compressor discharge flow rate is maintained at the target flow rate Gro.

More specifically, the external variable capacity compressor 11 of the discharge flow rate control type according to the third embodiment is provided with a throttle portion on its discharge side, with the pressure difference produced across the throttle portion being proportional to the discharge flow rate. Accordingly, increasing or decreasing the discharge capacity so that the pressure difference across the throttle portion is equal to a target pressure difference would allow the compressor discharge flow rate to be kept at the target flow rate Gro.

In this context, the capacity varying device 11b is provided with an electromagnetic mechanism for allowing the control current In to determine an electromagnetic force such that the electromagnetic mechanism determines an electromagnetic force corresponding to the aforementioned target pressure difference. The capacity varying device 11b is also provided with a valve mechanism which increases or decreases the degree of valve opening depending on the balance between the electromagnetic force corresponding to the target pressure difference and the force resulting from the pressure difference across the throttle portion.

The valve mechanism increases or decreases the degree of valve opening to thereby control the pressure in the swash plate chamber. This makes it possible to vary the angle of inclination of the swash plate so that the compressor discharge capacity is continuously varied within the range of about 0% to 100%. The external variable capacity compressor 11 of the discharge flow rate control type described above can also be used to provide the same operation and effects as those of the first embodiment. The external variable capacity compressor 11 of the discharge flow rate control type is well known to those skilled in the art as disclosed in Japanese Patent Laid-Open Publication No. 2001-107854.

[Fourth Embodiment]

Figure 8:
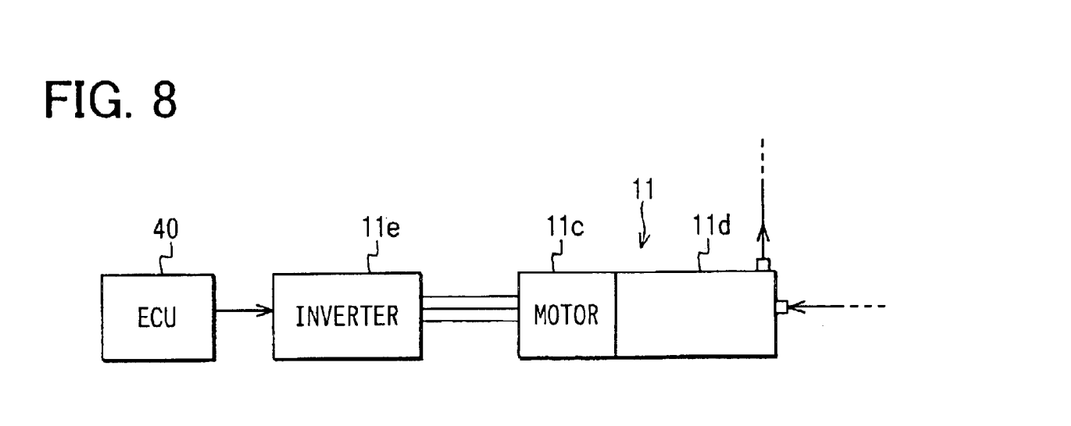
FIG. 8 is a control block diagram for a motor driven compressor according to a fourth embodiment.

The first to third embodiments have been explained with reference to their respective cases, in all of which the external variable capacity compressor 11 that can vary its discharge capacity is used as their compressor to vary the discharge flow rate by changing its discharge capacity. However, the fourth embodiment employs a motor driven compressor 11 as the compressor as shown in FIG. 8. The motor driven compressor 11 has a motor 11c and a compression mechanism portion 11d driven by the motor 11c, which are integrated with each other. More specifically, the motor 11c is a three-phase alternating-current motor, while the compression mechanism portion lid is a well-known scroll-type compression mechanism.

The frequency of the three-phase alternating-current power supply provided in the motor 11c can be variably controlled by means of an inverter 11e to control the RPM of the motor, thereby allowing the discharge flow rate of refrigerant from the motor driven compressor 11 to be increased or decreased in response to the magnitude of the RPM of the motor. The inverter 11e is controlled by the control output from the air-conditioning control unit 40.

According to the fourth embodiment, the front seat evaporator blowing temperature Tef and the rear seat evaporator blowing temperature Ter are compared with each other to control the RPM of the motor driven compressor 11 (i.e., the discharge flow rate of refrigerant from the motor driven compressor 11) such that the higher evaporator blowing temperature is equal to the target evaporator temperature TEO. This makes it possible to avoid a lack in cooling of the rear seat area in the passenger compartment even during a low flow rate of refrigerant.

On the other hand, suppose that the lower evaporator blowing temperature of the front seat evaporator blowing temperature Tef and the rear seat evaporator blowing temperature Ter has dropped to a predetermined frost determination temperature (e.g., −4° C.). In this case, the power supplied to the motor 11c is interrupted to bring the motor driven compressor 11 to a stop. This makes it possible to positively prevent the freezing from extending in the evaporator having the lower temperature at the front seat evaporator 9 and the rear seat evaporator 27.

As described above, the motor driven compressor 11 can be used as the compressor instead of the external variable capacity compressor 11 to provide the same operation and effects as those of the first to third embodiments.

[Other Embodiments]

The first embodiment employs the variable capacity compressor 11 having the electromagnetic clutch 11a to switch the energization of the electromagnetic clutch 11a to thereby switch the operation of the compressor 11. However, since the variable capacity compressor 11 reduces its discharge capacity to about 0%, the electromagnetic clutch 11a may be eliminated so that the rotational power of the motor vehicle engine is always transferred via a pulley, a belt or the like to the variable capacity compressor 11 during the operation of the engine. In this case, with the air conditioner switch 42e of the front seat air-conditioning panel 42 being in the OFF position, the discharge capacity of the variable capacity compressor 11 is maintained at the minimum capacity of about 0% to keep the variable capacity compressor 11 at a substantial standstill.

Furthermore, the first embodiment provides the blowing temperature sensors 41a, 41b, disposed on the air discharge side of the front seat evaporator 9 and the rear seat evaporator 27, for sensing the blowing air temperatures Tef and Ter, respectively, such that the blowing temperature sensors 41a, 41b are used as temperature sensor means for the front seat evaporator 9 and the rear seat evaporator 27. However, as the temperature sensor means for the front seat evaporator 9 and the rear seat evaporator 27, it is also acceptable to employ temperature sensor means for sensing the temperature on the surface of a fin and the like.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A vehicle air-conditioning system comprising:

a front seat air-conditioning unit for air-conditioning a front seat side in a passenger compartment, said front seat air-conditioning unit comprising a front seat evaporator, front seat evaporator temperature sensor means for sensing a temperature at said front seat evaporator, and a front seat air blower for blowing air into said front seat evaporator;

a rear seat air-conditioning unit for air-conditioning a rear seat side in the passenger compartment, said rear seat air-conditioning unit comprising a rear seat evaporator, rear seat evaporator temperature sensor means for sensing a temperature at said rear seat evaporator, and a rear seat air blower for blowing air into said rear seat evaporator, wherein said front seat evaporator and said rear seat evaporator are connected in parallel to each other in a refrigeration cycle, allowing one compressor to circulate a refrigerant through said front seat evaporator and said rear seat evaporator, said compressor allowing its discharge flow rate of the refrigerant to be controlled by an external control signal; and control means for receiving sensor signals from said front seat evaporator temperature sensor means and said rear seat evaporator temperature sensor means to control a discharge flow rate of the refrigerant from said compressor, wherein a discharge flow rate of the refrigerant from said compressor is controlled in accordance with a higher evaporator temperature of temperatures at said front seat evaporator and said rear seat evaporator and a target evaporator temperature.

2. The vehicle air-conditioning system according to claim 1, wherein said compressor is controlled to provide the refrigerant at a discharge flow rate of about zero when a lower evaporator temperature of temperatures at said front seat evaporator and said rear seat evaporator is dropped to a predetermined frost determination temperature.

3. The vehicle air-conditioning system according to claim 1, wherein said compressor is a variable capacity compressor that can vary its discharge capacity such that a discharge capacity of the variable capacity compressor is varied to thereby change the discharge flow rate of refrigerant.

4. The vehicle air-conditioning system according to claim 1, wherein said compressor is a motor driven compressor driven by a motor such that an RPM of the motor is controlled to thereby vary the discharge flow rate of refrigerant.

5. The vehicle air-conditioning system according to claim 1, wherein said target evaporator temperature is determined at least in accordance with a target blowing temperature of air blown into a passenger compartment from the front seat air-conditioning unit and a temperature of outside air.

6. The vehicle air-conditioning system according to claim 1, wherein while said compressor circulates the refrigerant through both said front seat evaporator and said rear seat evaporator, said control means controls the discharge flow rate of the refrigerant from said compressor in accordance with the higher evaporator temperature of the temperatures at said front seat evaporator and said rear seat evaporator and the target evaporator temperature.

7. The vehicle air-conditioning system according to claim 6, wherein said target evaporator temperature is a temperature that is common to front and rear seats.

8. A vehicle air-conditioning system comprising:

a front seat air-conditioning unit for air-conditioning a front seat side in a passenger compartment, wherein said front seat air-conditioning unit comprises a front seat evaporator, front seat evaporator temperature sensor means for sensing a temperature at said front seat evaporator, and a front seat air blower for blowing air into said front seat evaporator;

a rear seat air-conditioning unit for air-conditioning a rear seat side in the passenger compartment, wherein said rear seat air-conditioning unit comprises a rear seat evaporator, rear seat evaporator temperature sensor means for sensing a temperature at said rear seat evaporator, and a rear seat air blower for blowing air into said rear seat evaporator, wherein said front seat evaporator and said rear seat evaporator are connected in parallel to each other in a refrigeration cycle, allowing one compressor to circulate a refrigerant through said front seat evaporator and said rear seat evaporator, said compressor allowing its discharge flow rate of the refrigerant to be controlled by an external control signal; and control means for receiving a sensor signal from said front seat evaporator temperature sensor means and said rear seat evaporator temperature sensor means to control a discharge flow rate of the refrigerant from said compressor, wherein:

within a range of a high cooling heat load operation, a discharge flow rate of the refrigerant from said compressor is controlled only in accordance with a temperature at said front seat evaporator; and within a range of a low cooling heat load operation, a discharge flow rate of the refrigerant from said compressor is controlled in accordance with a higher evaporator temperature of temperatures at said front seat evaporator and said rear seat evaporator and a target evaporator temperature.

9. The vehicle air-conditioning system according to claim 8, wherein said compressor is controlled to provide the refrigerant at a discharge flow rate of about zero when a lower evaporator temperature of temperatures at said front seat evaporator and said rear seat evaporator is dropped to a predetermined frost determination temperature.

10. The vehicle air-conditioning system according to claim 8, wherein said compressor is a variable capacity compressor which can vary its discharge capacity such that a discharge capacity of the variable capacity compressor is varied to thereby change the discharge flow rate of refrigerant.

11. The vehicle air-conditioning system according to claim 8, wherein said compressor is a motor driven compressor which is driven by a motor such that an RPM of the motor is controlled to thereby vary the discharge flow rate of refrigerant.

12. The vehicle air-conditioning system according to claim 8, wherein said target evaporator temperature is determined at least in accordance with a target blowing temperature of air blown into a passenger compartment from the front seat air-conditioning unit and a temperature of outside air.

13. The vehicle air-conditioning system according to claim 8, wherein while said compressor circulates the refrigerant through both said front seat evaporator and said rear seat evaporator, said control means controls the discharge flow rate of the refrigerant from said compressor in accordance with the higher evaporator temperature of the temperatures at said front seat evaporator and said rear seat evaporator and the target evaporator temperature.

14. The vehicle air-conditioning system according to claim 13, wherein said target evaporator is a temperature that is common to front and rear seats.

15. A control unit for a vehicle air-conditioning system including a front seat air-conditioning unit for air-conditioning a front seat side in a passenger compartment, a rear seat air-conditioning unit for air-conditioning a rear seat side in the passenger compartment, and one compressor for circulating a refrigerant, said control unit comprising:

an input device for receiving control signals from a plurality of sensors, the front seat air-conditioning unit and the rear seat air-conditioning unit, wherein the control signals include signals indicative of a front seat evaporator blower temperature, a rear seat evaporator blower temperature and an outside air temperature; and a control program for determining a discharge flow rate for the refrigerant from the compressor of the vehicle air-conditioning system and for generating an external control signal representative of a discharge flow rate for the refrigerant, wherein said control program determines the discharge flow rate of the refrigerant from the compressor in accordance with a higher evaporator temperature of the front seat blower evaporator temperatures and the rear seat evaporator temperature and a target evaporator temperature.

16. The control unit of claim 15, wherein said control program further determines the discharge flow rate only in accordance with the front seat blower evaporator temperature within a range of a high cooling heat load operation.

17. The control unit of claim 15, wherein said control program determines the target evaporator temperature at least in accordance with a target blowing temperature of air blown into a passenger compartment from the front seat air-conditioning unit and the outside air temperature.

* * * * *